(12) United States Patent
Zhang et al.

(10) Patent No.: US 10,928,668 B2
(45) Date of Patent: Feb. 23, 2021

(54) BLACK MATRIX, COLOR FILTER AND METHOD OF PREPARING THE SAME, DISPLAY PANEL, AND DISPLAY DEVICE

(71) Applicants: Beijing BOE Optoelectronics Technology Co., Ltd., Beijing (CN); BOE Technology Group Co., Ltd., Beijing (CN)

(72) Inventors: Wenpeng Zhang, Beijing (CN); Xiuliang Wang, Beijing (CN); Zhinan Zhang, Beijing (CN); Yujia Wang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/439,162

(22) Filed: Jun. 12, 2019

(65) Prior Publication Data
US 2019/0293993 A1    Sep. 26, 2019

Related U.S. Application Data

(63) Continuation-in-part of application No. 15/325,164, filed as application No. PCT/CN2016/089406 on Jul. 8, 2016, now abandoned.

(30) Foreign Application Priority Data

Oct. 27, 2015 (CN) .......................... 201510706520.9

(51) Int. Cl.
*G02F 1/1335* (2006.01)
*G02F 1/1339* (2006.01)
*G02F 1/1368* (2006.01)

(52) U.S. Cl.
CPC ...... *G02F 1/133512* (2013.01); *G02F 1/1368* (2013.01); *G02F 1/13394* (2013.01);
(Continued)

(58) Field of Classification Search
CPC ................. G02F 1/133512; G02F 2001/13396
See application file for complete search history.

(56) References Cited

U.S. PATENT DOCUMENTS

2005/0128382 A1    6/2005  Baek et al.
2012/0019748 A1*   1/2012  Kim ................. G02F 1/133512
                                                              349/106

(Continued)

FOREIGN PATENT DOCUMENTS

CN         102346339 A     2/2012
CN         102749773 A    10/2012
(Continued)

OTHER PUBLICATIONS

Sep. 26, 2016—(WO) International Search Report and Written Opinion Appn PCT/CN2016/089406 with English Tran.
(Continued)

*Primary Examiner* — Jessica M Merlin
(74) *Attorney, Agent, or Firm* — Banner & Witcoff, Ltd.

(57) ABSTRACT

A black matrix, a color filter and a method of preparing the same, a display panel, and a display device are provided, including: a plurality of first walls extending along a first direction; and a plurality of second walls extending along a second direction intersected with the plurality of first walls along the first direction at intersection regions, wherein the plurality of first walls and the plurality of second walls form a mesh-like structure with a plurality of openings. At least one of the intersection regions is to receive a main support column including a top end, and the at least one of the intersection regions to receive the main support column is
(Continued)

widened to be larger than a dimension of the top end of the main support column to be received therein.

15 Claims, 6 Drawing Sheets

(52) U.S. Cl.
CPC ............... G02F 1/133516 (2013.01); *G02F 2001/13396* (2013.01)

(56) References Cited

U.S. PATENT DOCUMENTS

| | | | | |
|---|---|---|---|---|
| 2012/0307172 | A1* | 12/2012 | Yoshida | G02F 1/133707 349/43 |
| 2012/0327338 | A1* | 12/2012 | Kobayashi | G02F 1/133512 349/106 |
| 2015/0205160 | A1 | 7/2015 | Kim et al. | |
| 2016/0103353 | A1* | 4/2016 | Kim | G02F 1/13394 349/42 |
| 2016/0187717 | A1* | 6/2016 | Hosokawa | G02F 1/134309 349/110 |

FOREIGN PATENT DOCUMENTS

| | | |
|---|---|---|
| CN | 103513470 A | 1/2014 |
| CN | 103885260 A | 6/2014 |
| CN | 104049411 A | 9/2014 |
| CN | 105204218 A | 12/2015 |
| CN | 205038424 U | 2/2016 |

OTHER PUBLICATIONS

Sep. 29, 2017—(CN) First Office Action Appn 201510706520.9 with English Tran.

* cited by examiner

BLACK MATRIX, COLOR FILTER AND METHOD OF PREPARING THE SAME, DISPLAY PANEL, AND DISPLAY DEVICE

CROSS REFERENCE TO RELATED APPLICATIONS

The application is a continuation-in-part of U.S. application Ser. No. 15/325,164, filed Jan. 10, 2017, which is a U.S. National Phase Entry of International Application No. PCT/CN2016/089406 filed on Jul. 8, 2016, designating the United States of America and claiming priority to Chinese Patent Application No. 201510706520.9 filed on Oct. 27, 2015. The present application claims priority to and the benefit of the above-identified applications and the above-identified applications are incorporated by reference herein in their entirety.

TECHNICAL FIELD

Embodiments of the present disclosure relate to a black matrix, a display substrate, a display screen and a display device.

BACKGROUND

With the continuous development of liquid crystal displays (LCDs), high-resolution products are continuously developed. However, with the increased amount of pixels, the distance from a support column to a pixel is also sustainedly reduced, and a series of problems may occur.

SUMMARY

Embodiments of the present disclosure provide a black matrix, a color filter, a display substrate, a display screen and a display device, which are used to improve the display effect of the display device.

An embodiment of the present disclosure provides a black matrix. The black matrix includes a plurality of transverse walls; a plurality of longitudinal walls intersected with the plurality of transverse walls, wherein the plurality of transverse walls and the longitudinal walls forms a mesh with a plurality of openings; and a shielding region configured to shield a main support column being selectively provided at an intersected position of the transverse walls and the longitudinal walls of the black matrix. The shielding region completely covers the selected intersected position. Total area of the shielding regions is greater than total area of the intersected positions of the transverse walls and the longitudinal walls without the shielding regions; and a movable area of the main support column is within the corresponding shielding region.

In an example, the shielding region has a center which is the same as a center of the selected intersected position.

In an example, the shielding region is in a shape of rectangle, circle or diamond.

In an example, the main support column has a cylindrical structure; and an axial line of the support column runs through a center point of a corresponding shielding region.

In an example, a difference between the vertical distance from a boundary line of the shielding region to the axial line of the support column and a radius of the main support column is more than or equal to 1μm.

In an example, the difference between the distance from the boundary line of the shielding region to the axial line of the main support column and the radius of the support column is more than or equal to 1μm.

In an example, a second shielding region configured to shield a secondary support column is selectively provided at an intersected position of the transverse walls and the longitudinal walls of the black matrix. The second shielding region completely covers the selected intersected position; and a movable area of the secondary support column is within the corresponding second shielding region.

Embodiments of the present disclosure also provides a display substrate. The display substrate includes a substrate, the black matrix provided on the substrate, and a pixel color filter (CF) layer provided in the openings of the black matrix.

An embodiment of the present disclosure also provides a display screen. The display screen includes two opposite substrates, and a liquid crystal layer provided between the two opposite substrates, a black matrix and a plurality of support columns. The black matrix includes transverse walls and longitudinal walls. The plurality of support columns includes main support columns and secondary support columns. Area of an end surface of the main support columns is larger than area of an end surface of the secondary support columns. The support columns are provided at intersected positions of the transverse walls and the longitudinal walls. Shielding regions are configured to shield main support columns at the intersected positions. Each shielding region completely covers the selected intersected position. A movable area of each of the main support column is within the shielding region.

An embodiment of the present disclosure also provides a display device. The display device includes a body and the display screen provided on the body.

At least one embodiment of the present disclosure also provides a black matrix, comprising: a plurality of first walls extending along a first direction; and a plurality of second walls extending along a second direction intersected with the plurality of first walls along the first direction at intersection regions. The plurality of first walls and the plurality of second walls form a mesh-like structure with a plurality of openings. At least one of the intersection regions is configured to receive a main support column including a top end, and the at least one of the intersection regions to receive the main support column is widened to be larger than a dimension of the top end of the main support column to be received therein.

For example, at least two corners of the at least one of the intersection regions to receive the main support column is widened to be larger than the dimension of the top end of the main support column to be received therein.

For example, the at least two corners of the at least one of the intersection regions are widened to be about 1 μm, respectively.

Figure 4:
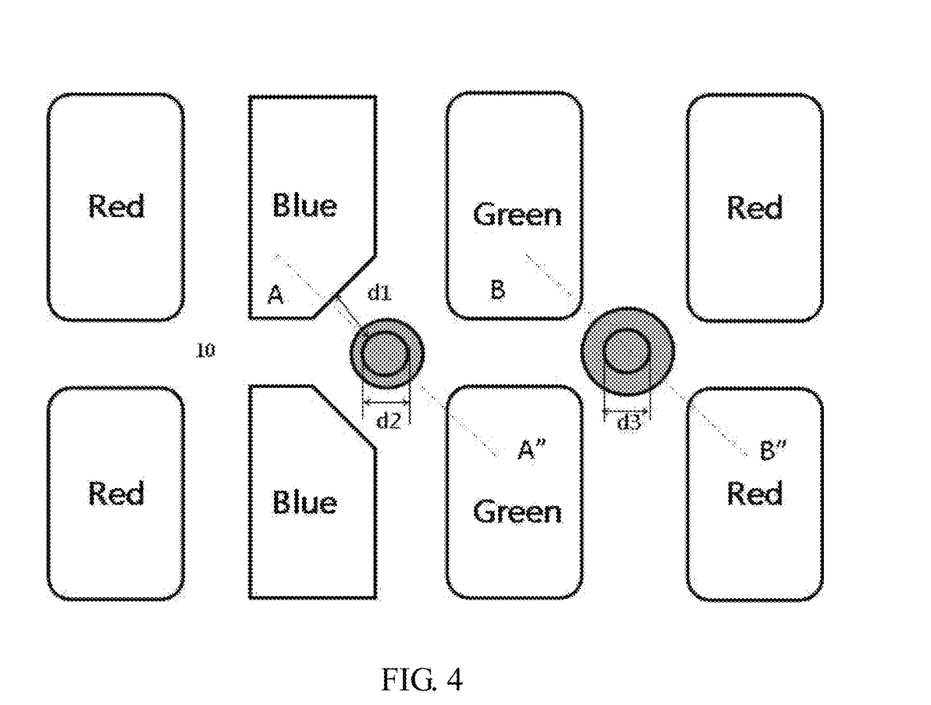
FIG. 4 is a schematically plan diagram of a color filter black matrix after the filter color is changed provided by an embodiment of the present disclosure.

For example, the widened intersection region is in any shape of a square-like, an oval-like, a circle-like, or a shape as shown in FIG. 4.

At least one embodiment of the present disclosure also provides a color filter, comprising the black matrix.

For example, the color filter further comprises a base substrate, and a color filter layer on the base substrate. The black matrix is provided on the base substrate and the color filter layer is provided in the openings of the black matrix.

At least one embodiment of the present disclosure also provides a display panel, comprising, an array substrate; a color filter (CF) substrate provided oppositely to the array substrate; and a liquid crystal layer provided between the array substrate and the CF substrate. The CF substrate comprises a base substrate, a color filter layer, and the black matrix.

For example, the main support column is provided between the CF substrate and the array substrate at a position of one of the intersection regions of the black matrix.

For example, the array substrate comprises a first thin film transistor (TFT), the main support column being supported between the first thin film transistor and the intersection region of the black matrix.

For example, the array substrate comprises a gate electrode; a gate insulating layer; an active layer; a first electrode layer; a source-drain electrodes; a passivation layer; and a second electrode provided thereon.

For example, the main support column is provided between the passivation layer and the black matrix.

For example, the TFT is a switch TFT or a drive TFT.

For example, the array substrate further comprises a second thin film transistor (TFT), the secondary support column being supported between the second thin film transistor and another intersection region of the black matrix.

For example, the dimension of the top end of the main support column is smaller than the dimension of the top end of the secondary support column.

At least one embodiment of the present disclosure also provides a display device, comprising the display panel.

At least one embodiment of the present disclosure also provides a method of preparing the color filter, comprising providing a base substrate; forming a color filter layer on the base substrate; forming a pattern of the color filter layer; and forming the black matrix corresponding to the pattern of the color filter layer.

For example, the pattern of the color filter layer comprises a plurality of separated regions, two or more corners of each of the separated regions being decreased in dimensions.

BRIEF DESCRIPTION OF THE DRAWINGS

Embodiments of the present disclosure will be described in detail hereinafter in conjunction with accompanying drawings to allow one of ordinary skill in the art to understand the present disclosure more clearly, in which.

DETAILED DESCRIPTION

Technical solutions according to the embodiments of the present disclosure will be described clearly and completely as below in conjunction with the accompanying drawings of embodiments of the present disclosure. It is apparent that the described embodiments are only a part of but not all of exemplary embodiments of the present disclosure. Based on the described embodiments of the present disclosure, various other embodiments can be obtained by those of ordinary skill in the art without creative labor and those embodiments shall fall into the protection scope of the present disclosure.

Pressing failure is a kind of defect that usually occurs in high-resolution products. In the production process, the panel is subjected to the shearing force of the outside, and the instantaneous misalignment between the color filter (CF) and the thin film transistor (TFT) occurs, The TFT side film (e.g., polyimide layer) corresponding to the main spacer may be damaged by the action of the main spacer. At the same time, due to the black matrix area around the main spacer is small, the damaged position cannot be effectively covered, a bright lines or the like may occur around the main spacer.

In embodiments of the present disclosure, a color filter black matrix (BM) is designed to widen the BM region around the main support column, and to slightly decrease the size of adjacent pixels accordingly. In this way, the BM region in a main support column is almost not changed, while it can greatly reduce the occurring of the press gap without changing the transmittance. According to test results, when the BM region in the main support column is widened by about 1 μm, the transmittance is almost not changed. That is, the change of the transmittance is within the normal fluctuation range, while the compression failure is reduced by 60%.

Figure 1:
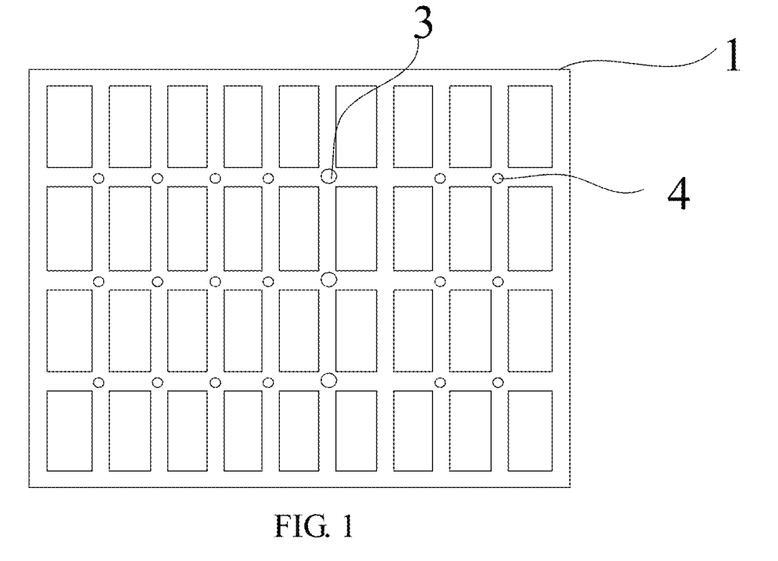
FIG. 1 is a schematically structural view of a black matrix.

As illustrated in FIG. 1, a display includes a display area and a non-display area. A black matrix 1 is disposed in the non-display area. Support columns are arranged at selected positions of the black matrix. The support columns include a plurality of main support columns 3 and secondary support columns 4. When the display is pressed, the main support columns 3 will move in some certain displacement. The main reason of poor pressing effect of the display is in that, when a shear direction force is externally applied to a display panel, an instantaneous dislocation occurs between a color filter (CF) substrate and an array substrate in opposite directions, and an alignment film on the array substrate corresponding to the main support column 3 is damaged due to the action of the main support column, to allow the display panel to be brighter on the periphery of the main support column 3, and the display effect of the display screen can be affected.

To improve the display effect of the display device, embodiments of the present disclosure provide a black matrix, a display substrate, a display screen and a display device. In the technical proposals of the embodiments of the present disclosure, the light phenomenon which occurs when an alignment film is damaged due to the movement of support columns can be avoided by improving the area of shielding regions on the black matrix corresponding to main support columns. Detailed description will be given below with reference to the accompanying drawings and the embodiments for helping understanding of the technical proposals of the present disclosure.

Figure 2:
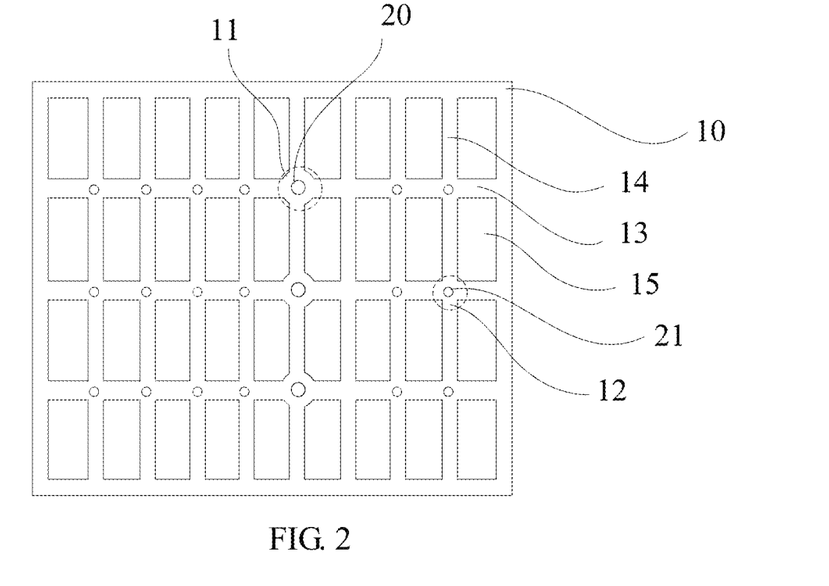
FIG. 2 is a schematically structural view of a black matrix provided by an embodiment of the present disclosure.

FIG. 2 is a schematic structural view of a black matrix provided by an embodiment of the present disclosure.

As illustrated in FIG. 2, a black matrix 10 is provided. The black matrix 10 includes a plurality of transverse walls 13 and a plurality of longitudinal walls 14 which are intersected with each other. A mesh-like structure is defined by the plurality of transverse walls 13 and the plurality of longitudinal walls 14 with a plurality of openings 15, and a shielding region for shielding each main support column 20 is selectively disposed at an intersected position of the transverse walls 13 and the longitudinal walls 14 of the black matrix. The shielding region completely covers the selected intersected position. The total area of the shielding regions is greater than the total area of intersected positions of the transverse walls 13 and the longitudinal walls 14 without the shielding regions. A movable area of the main support column 20 is within the shielding region.

In the embodiment, the area of the shielding region on the black matrix 10 corresponding to the main support column 20 is improved, so that the movable range of the main support column 20 can entirely fall within the shielding region corresponding to the main support column when the main support column 20 moves. When a light leakage phenomenon may occur due to the damage of an alignment film when the main support column 20 moves, the arranged shielding region can shield light, so that the light leakage phenomenon of the display screen can be avoided, and the display effect of the display can be improved.

Detailed description will be given below with reference to the accompanying drawings for helping understanding of the black matrix 10 provided by the embodiment of the present disclosure.

Continuing to refer to FIG. 2, FIG. 2 is a schematic structural view of the black matrix 10 provided by the embodiment of the present disclosure. As seen from FIG. 2, regions for shielding support columns are disposed on the black matrix 10 provided by the embodiment. The shielding regions are divided into first shielding regions 11 for shielding main support columns 20 and second shielding regions 12 for shielding secondary support columns 21. In the black matrix 10, the first shielding regions 11 make contact with the main support columns 20 correspondingly, and the second shielding regions 12 make contact with the secondary support columns 21 correspondingly. A vertical projection of a movable area of the support column on the black matrix 10 falls within the shielding region corresponding to the support column. That is to say, when the touch panel is pressed, no matter how the main support column 20 moves, the movable range entirely falls within the first shielding region 11. In this way, even the alignment film is damaged when the main support column 20 moves, the arranged first shielding region 11 will also shield the damaged area, so that light exposed from the damaged area cannot be emitted out. In this way, the light leakage phenomenon can be avoided, and the display effect of the display screen can be improved.

For instance, a center of the shielding region is the same as a center of the selected intersected position. That is to say, center points of the first shielding region 11 and the second shielding region 12 are respectively the same as center points of the intersected positions provided with the first shielding region and the second shielding region, so that it can avoid dimensions of different openings 15 near the intersected positions are different.

For instance, the shape of the first shielding region 11 may be different, e.g., it may be circular, rectangular, elliptical, diamond-shaped or irregular. In the embodiment, the first shielding region 11 is rectangular, circular or diamond-shaped.

In addition, the support columns in the embodiment may adopt different shapes, e.g., they may be cylindrical structures. Axial lines of the main support columns 20 run through center points of shielding regions corresponding to the main support columns. That is to say, the axial line of the main support column 20 is overlapped with the axial line of the first shielding region 11, so that the main support column 20 can be disposed at a central position of the first shielding region 11. By this design, the distance from the main support column 20 to any part of the boundary line of the first shielding region 11 is consistent, to allow the first shielding region 11 to shield the main support column when the main support column 20 moves in any direction. By this design, the first shielding region 11 may adopt small design area, to avoid the first shielding region 11 impacting the light transmittance of the display.

For instance, the difference between the vertical distance from the boundary line of the shielding region to the axial line of the support column and the radius of the support column is not less than about 1 μm. In this way, it allows the first shielding region 11 to completely cover the movable range of the main support column 20, and the impact of the first shielding region 11 to the light transmittance of the display can be maximally reduced.

For instance, the second shielding region 12 corresponding to the secondary support column 21 may also adopt similar design of the first shielding region 11. That is to say, when each secondary support column 21 moves, a vertical projection of a movable area of the secondary support column 21 on the black matrix 10 falls within the shielding region corresponding to the secondary support column, namely the second shielding region 12 completely covers the movable range of the secondary support column 21. In this way, the light leakage phenomenon which occurs when the alignment film is damaged due to the movement of the secondary support column 21 can be avoided.

An embodiment of the present disclosure provides a display substrate, which includes a substrate, the black matrix 10 disposed on the substrate, and a CF layer disposed in openings 15 of the black matrix 10.

In the embodiments, the area of the shielding region on the black matrix 10 corresponding to the main support column 20 is improved. When the main support column 20 moves, the movable range of the main support column can entirely fall within the shielding region corresponding to the main support column. When a light leakage phenomenon may occur due to the damage of an alignment film when the main support column 20 moves, the arranged shielding region can shield light. In this way, the light leakage phenomenon of the display can be avoided, and the display effect of the display screen can be improved.

The embodiment of the present disclosure also provides a display screen, which includes two opposite substrates, and a liquid crystal layer and a plurality of support columns disposed between the two opposite substrates. The plurality of support columns include main support columns 20 and secondary support columns 21. The area of an end surface of the main support column 20 is greater than the area of an end surface of the secondary support column 21.

In the embodiment, the area of the shielding region on the black matrix 10 corresponding to the main support column 20 is improved, so that the movable range of the main support column can entirely fall within the shielding region corresponding to the main support column when the main support column 20 moves. When a light leakage phenomenon may occur due to the damage of an alignment film when the main support column 20 moves, the provided shielding region can shield light, so that the light leakage phenomenon of the display can be avoided, and the display effect of the display screen can be improved.

An embodiment of the present disclosure also provides a display device, which includes a body and the foregoing display screen disposed on the body.

In the embodiments, the area of the shielding region on the black matrix 10 corresponding to the main support column 20 is improved, so that the movable range of the main support column 20 can entirely fall within the shielding region corresponding to the main support column when the main support column 20 moves. When a light leakage phenomenon may occur due to the damage of an alignment film when the main support column 20 moves, the provided shielding region can shield light, so that the light leakage phenomenon of the display can be avoided, and the display effect of the display screen can be improved.

As shown in FIG. 2 and FIGS. 2-7, for example, the dimension (e.g., diameter) of the top end of the main support column may be larger or smaller than the dimension of the top end of the secondary support column. For example, as shown in FIGS. 4-8, the dimension of the top end of the main support column may be smaller than the dimension of the top end of the secondary support column.

Figure 3:
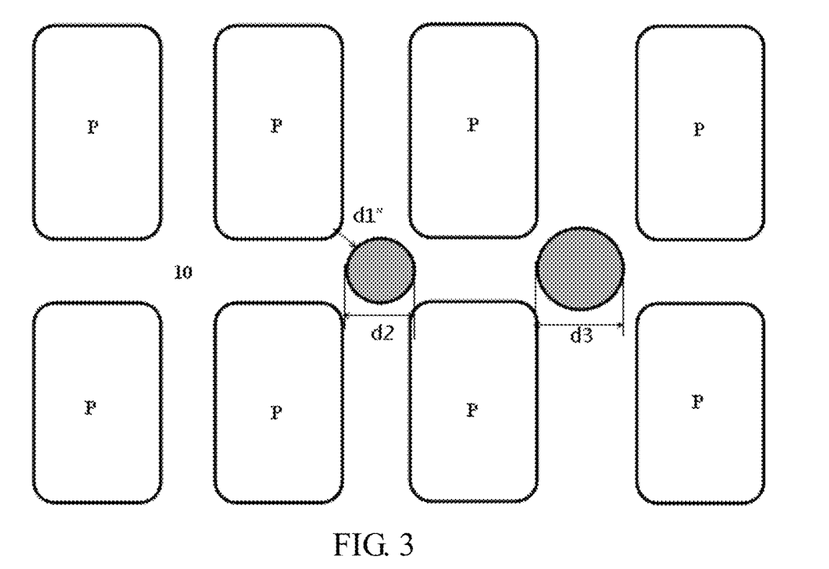
FIG. 3 is a schematically plan diagram of a color filter black matrix before the color filter is changed.

FIG. 3-FIG. 4 show a color filter (CF) black matrix (BM) before it is changed and after it is changed, respectively.

As shown in FIG. 3-FIG. 4, the top sizes (e.g., diameters) of a main support column 20 and a secondary support column 21 are represented by d2 and d3, respectively. Before the intersection region of the black matrix provided with the main support column/spacer 20 is widened, a distance between the boundary of the top end of the main support column 20 and pixel(s) P is represented by d1".

As shown in FIG. 4, after the intersection region of the black matrix provided with the main support column 20 is widened, the distance between the boundary of the top end of the main support column 20 and pixel(s) P is represented by d1. In this way, the distance between the main support column 20 and pixel(s) P is adjusted (i.e., widened) from d1" to d1. For example, the pixels P may include Red, Blue, or Green, or other colors of pixels.

Figure 6:
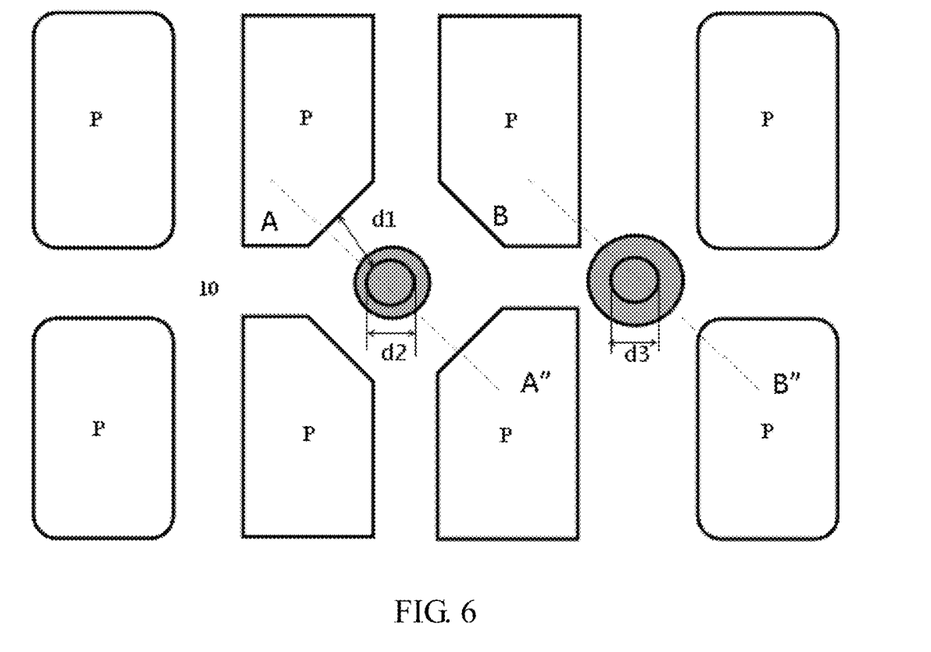
FIG. 6 is a schematically plan diagram of a color filter black matrix after the filter color is changed provided by another embodiment of the present disclosure.
Figure 7:
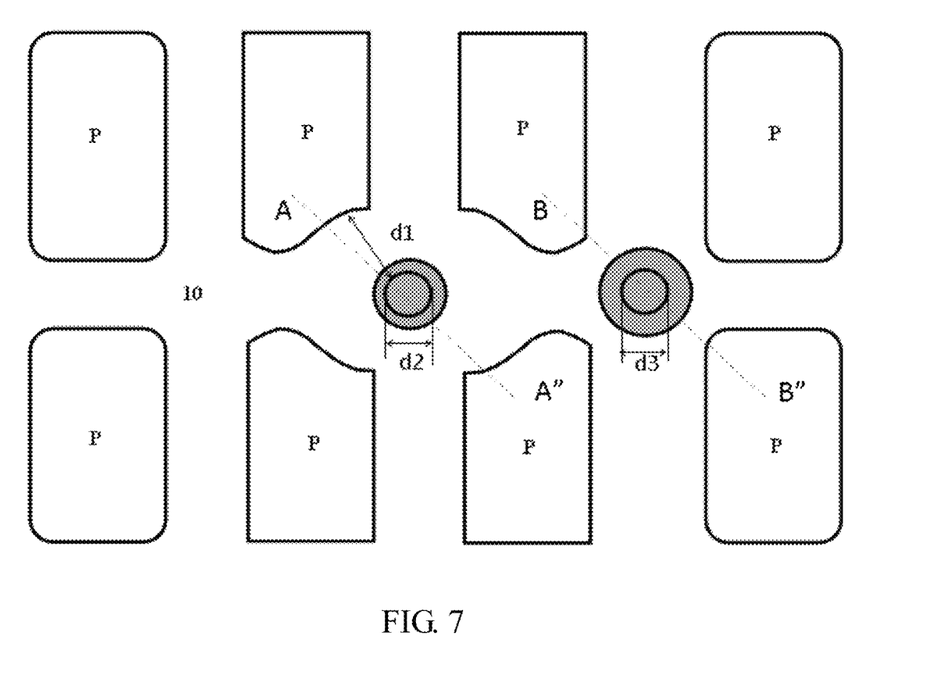
FIG. 7 is a schematically plan diagram of a color filter black matrix after the filter color is changed provided by yet another embodiment of the present disclosure.

For example, two or more corners of an intersection region of the black matrix, in which a main support column is provided, are widened or enlarged properly, correspondingly, two or more pixels P at the corresponding corners of the intersection region of the black matrix 10 are decreased in dimension accordingly, so that the distance between the main support column 20 and the pixel(s) P is adjusted from d1" to d1, where d1 is larger than d1". In other words, for example, by adjusting two or more pixel sizes, the distances between the main support column 20 and the pixels are widened, i.e., d1>d1", however, the present embodiments are not limited thereto. For example, as shown in FIGS. 6-7, four corners of the intersection regions of the black matrix may be widened. In this way, the area of each intersection region of the black matrix provided with a main support column is larger than the area of each intersection region of the black matrix provided with a secondary support column, as also shown in FIG. 8.

For example, the corners of the intersection region of the BM may be widened in a same way and a same scale. That is, the widened distance d1 corresponding to each corners of the pixels around the intersection region of the BM is the same.

For example, d1 may be in a range of about 0.5 μm to about 1 μm. For example, d1 may be about 1 μm.

Figure 5:
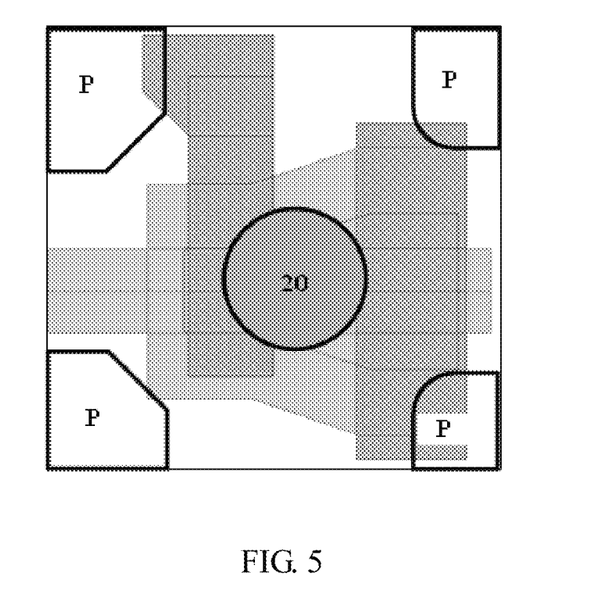
FIG. 5 is a schematically structural view of an intersection region of a color filter black matrix with main support column provided by an embodiment of the present disclosure.
Figure 8:
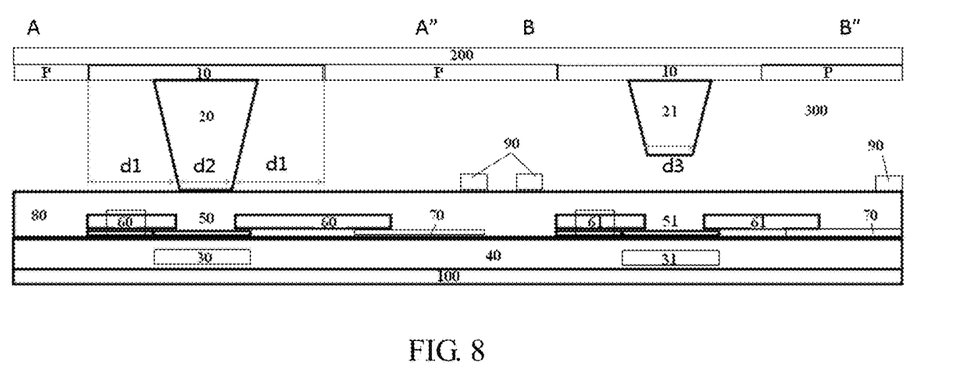
FIG. 8 is a schematically cross-sectional view of a display panel taken along lines A-A' and B-B' with color filter substrate and array substrate provided by an embodiment of the present disclosure.

For example, as shown in FIG. 5 and FIG. 8, the main support column 20 may be disposed between the CF black matrix and the array substrate.

For example, the main support column may be disposed above a thin film transistor (TFT) position, centered substantially at the center of the active layer (e.g., a-Si) of the TFT and below the CF BM.

Further as shown in FIG. 8, a schematically sectional view of a display panel with CF BM is illustrated. As shown in FIG. 8, the display panel may comprises an array substrate 100, a color filter substrate 200 disposed oppositely to the array substrate 100, and a liquid crystal layer 300 disposed between the CF substrate 200 and the array substrate 100. For example, a first thin film transistor (TFT) may be formed on the array substrate. For example, the first TFT may be disposed correspondingly to or not correspondingly to position of the main support column 20. For example, the TFT may be a switch TFT or a drive TFT, embodiments of the present disclosure are not limited thereto. For example, a first gate electrode 30, a gate insulating layer 40, a first active layer 50 (e.g., a-Si), a first electrode layer 70 (e.g., ITO), a first source-drain electrodes 60, a passivation layer 80, and a second electrode 90 (e.g., ITO) may be formed on the array substrate 100. For example, a second thin film transistor (TFT) may be disposed on the array substrate in a position corresponding to or not corresponding to the position of the secondary support column 21. For example, a second gate electrode 31, a second active layer 51 (e.g., a-Si), and a second source-drain electrodes 61 are formed on the array substrate 100. For example, a color filter layer is formed on the CF substrate 200, and the pixels P, such as Red, Green, or Blue, are formed in the openings of the black matrix mesh, respectively. For example, the first TFT and the second TFT may be formed in a same way or processes. However, the embodiments of the present application are not limited thereto.

As shown in the FIG. 8, for example, the main support column 20 is disposed between the array substrate and the CF substrate. For example, the main support column 20 may be supported above the first TFT, and the distance between the boundary of the top end of the main support column 20 and the pixels is d1, which is larger than d1". In this way, the distance between the main support column 20 and the pixels P reaches a safe value, so that when the display panel is pressed or forced to cause the support column(s) to move, the possibly damaged film(s) (e.g., PI film) can also be stopped by the black matrix, no poor yield happens. For example, the secondary support column 21 is also disposed between the array substrate and the CF substrate. For example, the secondary support column 20 may be supported above the second TFT.

In the embodiments, an intersection region of the BM provided with the main support column can be widened to a proper width, for example, to allow the d1 in each corners of the intersection region of the BM provided with a main support column to be about 0.5 μm to about 1 μm, for example, about 1 μm, the transmittance can also meet the requirements. In this way, the pressing failure can be reduced by 60%, while the transmittance is almost not changed, and it is within the fluctuation range.

For example, a BM region or an intersection region of the BM where a main support column is provided, can be widened in a circular shape, or in a shape of a square-like, or an oval-like, or a diamond-like, as shown in FIGS. 2, 6-7, or in a shape as shown in FIG. 4. However, the embodiments of the present disclosure are not limited thereto.

For example, for an instance of five or six pixels are provided around the intersection region of the BM, the intersection region of the BM provided with a main support column may be accordingly formed in a shape of pentagon, or hexagon.

For example, the black matrix with the widened intersection regions can be formed before the pixels or color filter layer are formed in the openings of the BM. For example, the black matrix may be formed with intersection regions in any shape of a circle-like, square-like, an oval-like, diamond-like, pentagon-like, or a hexagon-like, and then a filter layer or pixels of different colors are formed in the various shapes of openings surrounded by the black matrix with corresponding shape of intersection regions, as shown in FIGS. 2, 4-8.

For example, the black matrix with the widened intersection regions are formed accordingly after the color filter layer with various patterns, in which two or more corners of the pixels are cut or decreased, is formed, as shown in FIGS. 2, 4-8.

An embodiment of the present disclosure also provides a display device comprising the CF BM, or the display panel as illustrated above. The display device in the present embodiment may be any product or component with display function, such as mobile phone, tablet computer, television, display, notebook computer, digital photo frame, and navigator.

An embodiment of the present disclosure also provides a method of preparing the color filter, comprising, providing a base substrate; forming a color filter layer on the base substrate; forming a pattern of the color filter layer by an etching process, the pattern of the color filter layer including a plurality of separated regions, and two or more corners of each of the separated regions are decreased in dimensions; and forming the black matrix corresponding to the pattern of the color filter layer.

By the design of the present embodiments, as shown in Table 1, the transmittance of the display panel/display device is not changed, while the pressing failure is significantly reduced.

TABLE 1

| transmittance of common CF | | | Transmittance of CF in which BM region with main column support is widened by 1 μm | | |
|---|---|---|---|---|---|
| Min | Ave | Max | Min | Ave | Max |
| 380 | 409 | 433 | 378 | 422 | 452 |

Figure 9:
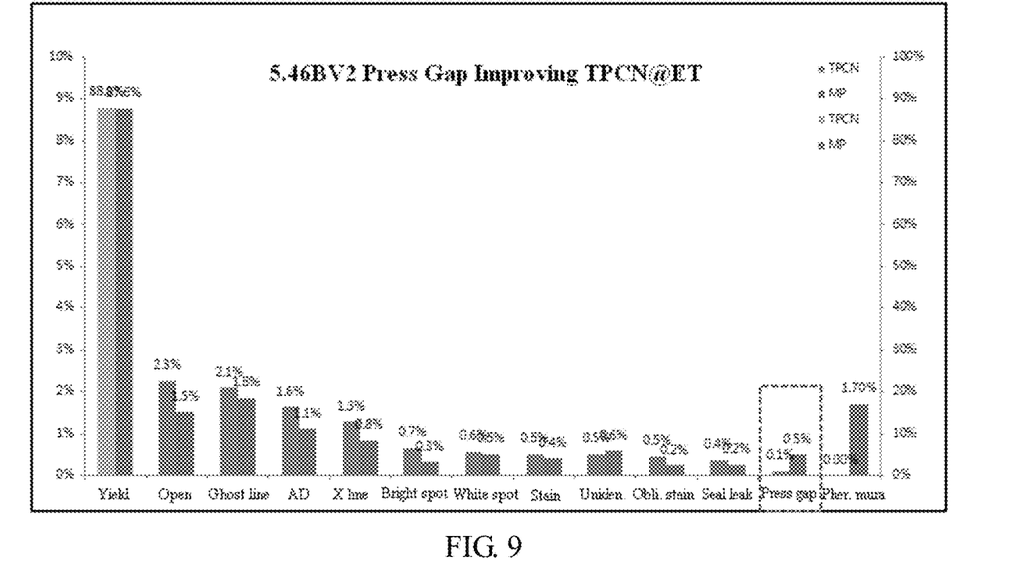
FIG. 9 is a diagram illustrating test result of a display device according to an embodiment of the present disclosure at one procedure position 'ET'.
Figure 10:
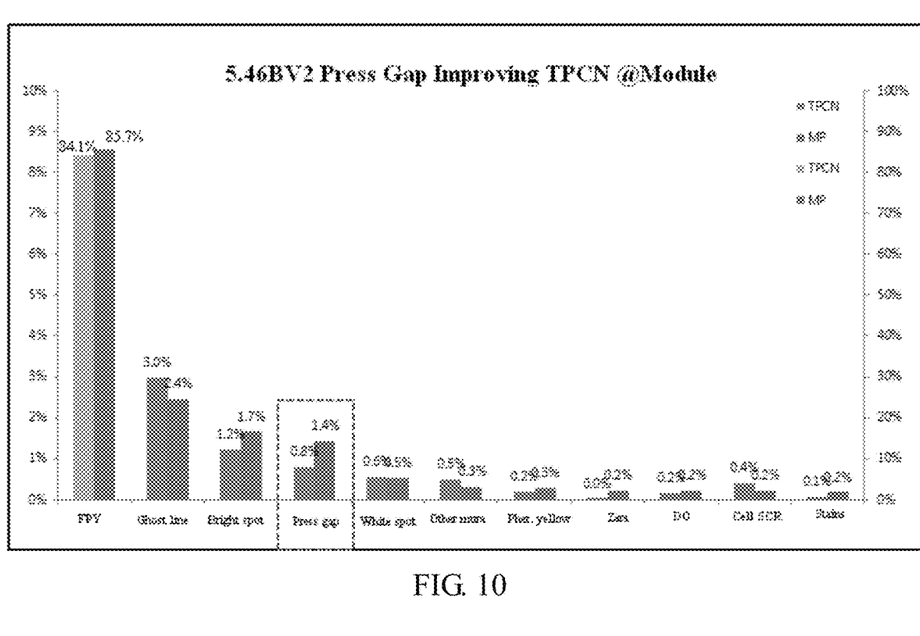
FIG. 10 is a diagram illustrating test result of the display device according to an embodiment of the present disclosure at another procedure position 'Module'.

As shown in FIG. 9-FIG. 10, test results of samples at two working positions are illustrated, and the final poor yield is obtained by considering the two test results. As shown in the figures and Table 1, by the present BM design, the Press gap is significantly reduced without changing the transmittance and product yield of the display panel and display device in both of mass production (MP) and test production (TP).

The embodiments of the present disclosure provide a new CF BM design, by widening the BM region provided with the main support column without changing the original resolution and transmittance, or the original TFT design, an extremely significant improvement to the poor pressing is achieved. According to the test results, the BM region provided with the main support column is widened by about 1 μm, the transmittance is almost unchanged, while the pressing failure is reduced by 60% within the fluctuation range, and it has no other adverse risks. The embodiments of the present disclosure provide an effective and significant improvement ways to poor pressing for high-resolution products.

The foregoing is only the exemplary embodiments of the present disclosure and not intended to limit the scope of the present disclosure. Any change or replacement that may be easily thought of by one of ordinary skill in the art shall fall within the scope of the present disclosure.

What is claimed is:

1. A display panel, comprising:
   an array substrate including a first thin film transistor (TFT), a second thin film transistor (TFT), and a passivation layer on the first TFT and the second TFT;
   a color filter (CF) substrate provided oppositely to the array substrate;
   a liquid crystal layer provided between the array substrate and the CF substrate;
   a main support column provided between the CF substrate and the array substrate; and
   a secondary support column provided between the CF substrate and the array substrate;
   wherein the CF substrate comprises a base substrate, a color filter layer on the base substrate, and a black matrix on the base substrate, wherein the black matrix comprises:
   a plurality of first walls extending along a first direction; and
   a plurality of second walls extending along a second direction and intersected with the plurality of first walls along the first direction at intersection regions, wherein the plurality of first walls and the plurality of second walls form a mesh-like structure with a plurality of openings, the plurality of openings are filled with the color filter layer to form pixels,
   wherein at least one of the intersection regions is configured to receive the main support column including a top end, and at least another one of the intersection regions is configured to receive the secondary support column including a top end, and a dimension of the top end of the main support column is smaller than a dimension of the top end of the secondary support column, the main support column is provided between a position on the passivation layer corresponding to the first TFT and the at least one of the intersection regions, and the secondary support column is provided between another position of the passivation layer corresponding to the second TFT and the at least another one of the intersection regions,
   wherein the at least one of the intersection regions to receive the main support column is widened to be larger than a dimension of the top end of the main support column to be received therein, and the widened intersection region has an oval-like shape or a pentagon-like shape, and a distance d1 between a boundary of the top end of the main support column and a boundary of the widened intersection region in the at least one of the intersection regions is in a range of about 0.5 μm to about 1 μm, and a press gap is about 0.1% to 0.8%.

2. The display panel according to claim 1, wherein the array substrate further comprises a gate electrode; a gate insulating layer; an active layer; a first electrode layer; source-drain electrodes; and a second electrode provided thereon.

3. The display panel according to claim 1, wherein the first TFT is one of a switch TFT or a drive TFT, and the second TFT is another one of the switch TFT or the drive TFT.

4. The display panel according to claim 1, wherein the first TFT comprises a first active layer, the second TFT comprises a second active layer, the top end of the main support column is provided on the first active layer of the first TFT, and the top end of the secondary support column is provided on the second active layer.

5. The display panel according to claim 1, wherein an orthographic projection of each of the main support column and the secondary support column on the array substrate falls in that of a corresponding intersection region on the array substrate.

6. A display device, comprising a display panel, wherein the display panel comprises:
- an array substrate including a first thin film transistor (TFT), a second thin film transistor (TFT), and a passivation layer on the first TFT and the second TFT;
- a color filter (CF) substrate provided oppositely to the array substrate;
- a liquid crystal layer provided between the array substrate and the CF substrate;
- a main support column provided between the CF substrate and the array substrate; and
- a secondary support column provided between the CF substrate and the array substrate,
- wherein the CF substrate comprises a base substrate, color filter layer on the base substrate, and a black matrix on the base substrate, wherein the black matrix comprises:
- a plurality of first walls extending along a first direction; and
- a plurality of second walls extending along a second direction and intersected with the plurality of first walls along the first direction at intersection regions, wherein the plurality of first walls and the plurality of second walls form a mesh-like structure with a plurality of openings, the plurality of openings are filled with the color filter layer to form pixels,
- wherein at least one of the intersection regions is configured to receive the main support column including a top end, and at least another one of the intersection regions is configured to receive the secondary support column including a top end, and a dimension of the top end of the main support column is smaller than a dimension of the top end of the secondary support column, the main support column is provided between a position of the passivation layer corresponding to the first TFT and the at least one of the intersection regions, and the secondary support column is provided between another position of the passivation layer corresponding to the second TFT and the at least another one of the intersection regions,
- wherein the at least one of the intersection regions to receive the main support column is widened to be larger than a dimension of the top end of the main support column to be received therein, and the widened intersection region has an oval-like shape or a pentagon-like shape, and a distance d1 between a boundary of the top end of the main support column and a boundary of the widened intersection region in the at least one of the intersection regions is in a range of about 0.5 µm to about 1 µm, and a press gap is about 0.1% to 0.8%.

7. The display device according to claim 6, wherein the first TFT comprises a first active layer, the second TFT comprises a second active layer, the top end of the main support column is provided on the first active layer of the first TFT, and the top end of the secondary support column is provided on the second active layer.

8. The display device according to claim 6, wherein the array substrate further comprises a gate electrode; a gate insulating layer; an active layer; a first electrode layer; source-drain electrodes; and a second electrode provided thereon.

9. The display device according to claim 6, wherein the first TFT is one of a switch TFT or a drive TFT, and the second TFT is another one of the switch TFT or the drive TFT.

10. The display device according to claim 6, wherein an orthographic projection of each of the main support column and the secondary support column on the array substrate falls in that of a corresponding intersection region on the array substrate.

11. A method of preparing a display panel, wherein the display panel comprises: an array substrate including a first thin film transistor (TFT), a second thin film transistor (TFT), and a passivation layer on the first TFT and the second TFT; a color filter (CF) substrate provided oppositely to the array substrate; a liquid crystal layer provided between the array substrate and the CF substrate; a main support column provided between the CF substrate and the array; and a secondary support column provided between the CF substrate and the array substrate, wherein the CF substrate comprises a base substrate, a color filter layer on the base substrate, and a black matrix on the base substrate, wherein the black matrix comprises: a plurality of first walls extending along a first direction; and a plurality of second walls extending along a second direction and intersected with the plurality of first walls along the first direction at intersection regions, wherein the plurality of first walls and the plurality of second walls form a mesh-like structure with a plurality of openings, the plurality of openings are filled with the color filter layer to form pixels, wherein at least one of the intersection regions is configured to receive the main support column including a top end, and at least another one of the intersection regions is configured to receive the secondary support column including a top end, and a dimension of the top end of the main support column is smaller than a dimension of the top end of the secondary support column, the main support column is provided between a position on the passivation layer corresponding to the first TFT and the at least one of the intersection regions, and the secondary support column is provided between another position of the passivation layer corresponding to the second TFT and the at least another one of the intersection regions, wherein the at least one of the intersection regions to receive the main support column is widened to be larger than a dimension of the top end of the main support column to be received therein, and the widened intersection region has an oval-like shape or a pentagon-like shape, and a distance d1 between a boundary of the top end of the main support column and a boundary of the widened intersection region in the at least one of the intersection regions is in a range of about 0.5 µm to about 1 µm, and a press gap is about 0.1% to 0.8%, the method comprising:
- providing the array substrate including the first TFT, the second TFT, and the passivation layer on the first TFT and the second TFT;
- providing the CF substrate oppositely to the array substrate;
- providing the liquid crystal layer between the array substrate and the CF substrate;

forming the main support column between the CF substrate and the array substrate; and forming the secondary support column between the CF substrate and the array substrate, wherein the providing the CF substrate comprises:
  providing the base substrate;
  forming the color filter layer on the base substrate;
  forming a pattern of the color filter layer; and
  forming the black matrix, wherein the black matrix corresponds to the pattern of the color filter layer.

12. The method according to claim 11, wherein the pattern of the color filter layer comprises a plurality of separated regions, corners of each of the separated regions being decreased in dimensions to form the oval-like shape or the pentagon-like shape intersection region to receive the main support column.

13. The method according to claim 11, wherein the first TFT comprises a first active layer, the second TFT comprises a second active layer, the top end of the main support column is provided on the first active layer of the first TFT, and the top end of the secondary support column is provided on the second active layer.

14. The method according to claim 11, wherein the first TFT is one of a switch TFT or a drive TFT, and the second TFT is another one of the switch TFT or the drive TFT.

15. The method according to claim 11, wherein an orthographic projection of each of the main support column and the secondary support column on the array substrate falls in that of a corresponding intersection region on the array substrate.

* * * * *